(12) United States Patent
Noldus et al.

(10) Patent No.: US 8,494,527 B2
(45) Date of Patent: Jul. 23, 2013

(54) METHOD FOR TRANSFERRING A COMMUNICATION SESSION IN A TELECOMMUNICATIONS NETWORK FROM A FIRST CONNECTION TO A SECOND CONNECTION

(75) Inventors: Rogier Noldus, Goirle (NL); Sjaak Derksen, Nieuwegein (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/384,315

(22) PCT Filed: Jul. 23, 2009

(86) PCT No.: PCT/EP2009/059516
§ 371 (c)(1),
(2), (4) Date: Jan. 19, 2012

(87) PCT Pub. No.: WO2011/009490
PCT Pub. Date: Jan. 27, 2011

(65) Prior Publication Data
US 2012/0115483 A1 May 10, 2012

(51) Int. Cl.
*H04W 36/00* (2009.01)
(52) U.S. Cl.
USPC ..... 455/436; 455/442; 455/432.1; 455/435.1; 455/422.1; 370/331
(58) Field of Classification Search
USPC .. 455/436, 442, 432.1, 435.1, 422.1; 370/331
See application file for complete search history.

(56) References Cited

U.S. PATENT DOCUMENTS 8,279,862 B2 * 10/2012 Sbisa et al. ............. 370/360
2006/0258358 A1 * 11/2006 Kallio .................... 455/437

OTHER PUBLICATIONS

3rd Generation Partnership Project. "Selection of UE Transfer Mode with Different User Plane and Control Signalling." 3GPP TSG SA WG2 Meeting #64, S2-082731 (rev of 2298), Jeju Island, Korea, Apr. 7-11, 2008.
3rd Generation Partnership Project. Technical Specification Group Services and Architecture: "Feasibility Study on Multimedia Session Continuity; Stage 2 (Release 8)." 3GPP TR 23.893 V.8.0.0, Jun. 2008, pp. 1-60.
3rd Generation Partnership Project. Technical Specification Group and System Aspects: "IP Multimedia Subsystem (IMS) Service Continuity Enhancements; Service, Policy and Interaction; Stage 2 (Release 9)." 3GPP TR 23.838 V9.0.0, Jun. 2009, pp. 1-51.

* cited by examiner

*Primary Examiner* — Nghi H Ly
(74) *Attorney, Agent, or Firm* — Coats & Bennett, P.L.L.C.

(57) ABSTRACT

The invention relates to an application server in a telecommunications network for transferring a communication session from a first connection between a first client and a remote client to a second connection between a second client and the remote client. The communication session comprises a media path and a signalling path. The application server being arranged to a) receive a transfer request, b) send a set-up request to the second client, for setting up the second connection, c1) transfer the signalling path, c2) transfer the media path, d) send an update message towards the remote party, the update message comprising an indication that the transfer has been executed, and e) send a termination message to the first client to terminate the first connection.

14 Claims, 4 Drawing Sheets

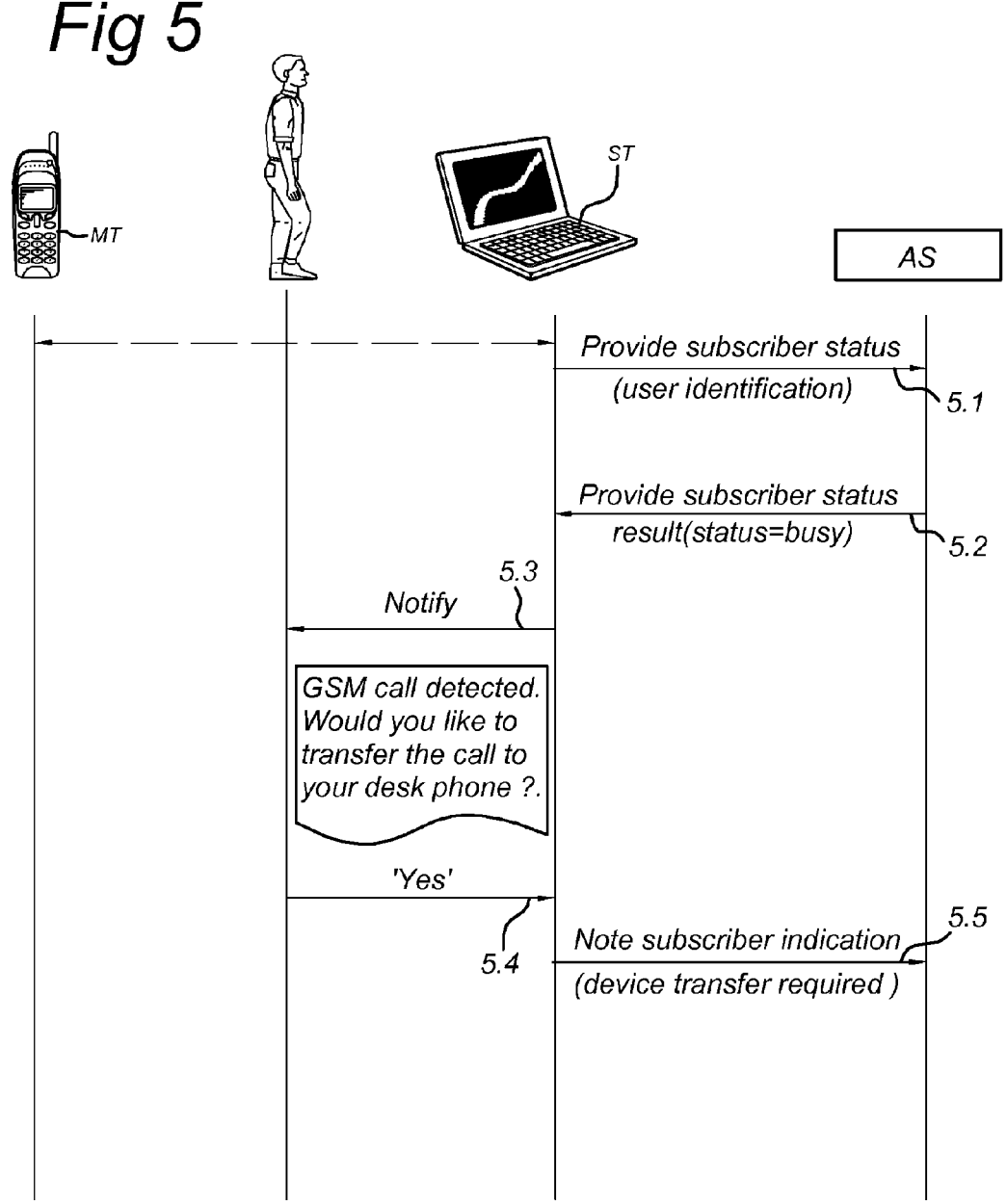

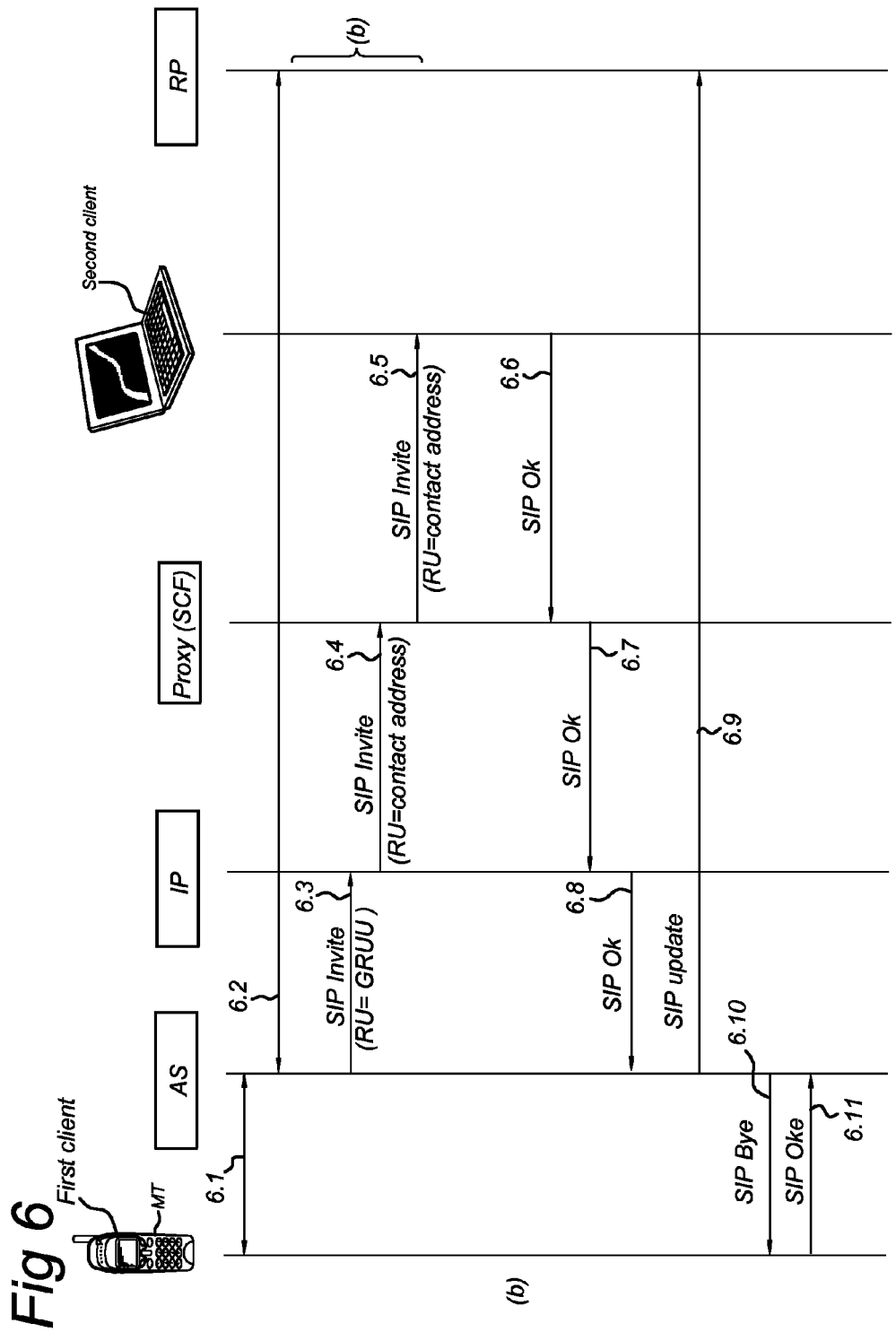

METHOD FOR TRANSFERRING A COMMUNICATION SESSION IN A TELECOMMUNICATIONS NETWORK FROM A FIRST CONNECTION TO A SECOND CONNECTION

TECHNICAL FIELD

The invention relates to an application server, a method and a client in a telecommunications network for transferring a communication session from a first connection between a first client in a first communication device and a remote client to a second connection between a second client in a second communication device and the remote client, the communication session comprising a media path and a signalling path. The invention further relates to a computer program, and a computer-readable medium product comprising such a computer program.

BACKGROUND

IP Multimedia Subsystem (IMS) is the technology defined by the Third Generation Partnership Project (3GPP) to provide IP Multimedia services over mobile communications networks. IMS is specified in, amongst others, 3GPP TS 22.228, version 8.5.0. IMS provides key features to enrich the end-user person-to-person communication experience through the integration and interaction of services.

The IMS makes use of the Session Initiation Protocol (SIP) to set up and control calls or sessions between communication devices (also known as user terminals (UEs)) or between communication devices and application servers (AS). The Session Description Protocol (SDP), carried by SIP signalling, is used to describe and negotiate the media components of the session. Whilst SIP was created as a user-to-user protocol, IMS allows operators and service providers to control subscriber access to services and to charge subscribers accordingly. Telephones using this protocol are referred to as SIP telephone.

A SIP telephone may be any telephone tool, including a software tool, also referred to as a client, running on a computer, using an IP telephony signalling protocol. The SIP telephone may be used for any media type, including voice data, video data etc. The SIP telephone is typically location bound, but may also use a wireless internet connection.

Nowadays, subscribers may have more than one telephone device in use, such as a wireline/wireless SIP telephone and a (cellular) mobile telephone. The term mobile telephone is used in this text to denote any telephone that is not location bound, i.e. a mobile telephone using a cellular telephone network, enabling the mobile network to be mobile. A mobile telephone may for instance use the GSM-network or the UMTS-network. The term mobile telephone does not comprise cordless telephones, which are bound to a location, i.e. are bound to a Wireless Local Area Network (WLAN) base station.

The SIP telephone will typically be used at a specific location, such as at home or at the office, whereas the mobile telephone will typically be used when being somewhere else than at the specific location of the SIP telephone. When the subscriber establishes or receives a call, he/she will use the device that is most suitable at that moment or the most cost-efficient. When a subscriber receives a call, the incoming call may be alerting on the SIP telephone as well as on the mobile telephone, providing the subscriber with the option to choose which one to use. Reasons for using the SIP telephone may be:

- SIP telephone may support a (more user-friendly) hands-free function than the mobile telephone;
- SIP telephone has a lower tariff than a mobile telephone.

The preferred device (SIP telephone or mobile telephone) may change during the call. For instance,

- a subscriber may want to change from SIP telephone to mobile telephone when the subscriber wants to walk away from the SIP telephone,
- a subscriber may want to change from mobile telephone to SIP telephone when the subscriber arrives at the location of the SIP telephone.

According to the prior art transferring a communication session from a first connection between a first client in a first communication device (e.g. SIP-telephone) and a remote client to a second connection between a second client in a second communication device (e.g. mobile telephone) and the remote client, the communication session comprising a media path and a signalling path may be done using the service Explicit Call Transfer (ECT), as specified for and performed by the Global System for Mobile Communication (GSM) and Universal Mobile Telecommunication System (UMTS) network. ECT, however, has the disadvantage that the remote party is temporarily put on hold. In addition, when a subscriber wants to use ECT to transfer a call to one of his/her other communication devices, the subscriber in fact imitates a call to his/herself, which may result in unpredictable service behaviour. The unpredictability of such situation may manifest itself e.g. through the execution of terminating call services associated with the subscriber. Alternatively, the system would not allow 'calling yourself'. In general, ECT is not suitable for device transfer, as ECT essentially entails establishing another call.

Also, initiating a call to one of his/her other communication devices involves inputting a telephone number or the like (e.g. using a memory button), which may be considered cumbersome.

According to the prior art, the IMS network may comprise application servers which are arranged to host and execute services. Application servers may be located in the home network (possibly having access to a Home Subscriber Server (HSS), further explained below) or may be located outside the home network.

The register HSS is in fact a database comprising information about the IMS network subscribers. The HSS may comprise information about the subscriber's subscription, i.e. user profiles. Also, the HSS plays an important role when a user terminal registers to the IMS network, as it authenticates and authorizes the user terminal. The HSS will be explained in more detail below.

An example of such a service is the Voice Call Continuity (VCC); see 3GPP TS 23.206 v7.4.0, which comprises the anchoring in IMS of a call established to/from the subscriber. Anchoring in IMS for the call is, according to VCC, done at a VCC application server (AS). The VCC-AS functions as a link between the access leg for the call and the IMS network.

VCC is designed to facilitate access transfer using a single, multi access device, e.g. to change from SIP over WLAN access to GSM access. It should be emphasised that VCC can not be used for transferring a call between different devices.

When the VCC device detects that access transfer is required, e.g. because the WLAN radio signal is fading, the VCC device initiates transfer of the call from WLAN to GSM. While WLAN was used, the call was established with SIP. When GSM is used for access, protocols such as Direct Transfer Application Part (DTAP) and Integrated Services Digital Network User Part (ISUP) are used for call establishment. After the access transfer, the access leg between the device and the network has changed from SIP (over WLAN) to GSM. Within the IMS network, the call is not affected. Although the VCC device has two radio interfaces (typically WLAN and Time Division Multiple Access (TDMA)) and corresponding protocol stacks (SIP for WLAN and DTAP for TDMA), it has a single user interface. The access transfer can therefore be hidden for the subscriber.

The prior art solutions do not allow to seamlessly transfer communication between two different communication devices, such as a SIP telephone and a mobile telephone.

SUMMARY

It is an object to provide a method mechanism that provides improved communication transfer between two different communication devices.

This object is achieved by the method, application server, computer program and a computer-readable medium product as described in the independent claims.

Advantageous embodiments are described in the further claims.

In an embodiment a method for transferring a communication session in a telecommunications network from a first connection between a first client and a remote client to a second connection between a second client and the remote client is disclosed. The communication session comprises a media path and a signalling path. The telecommunications network comprises an application server for transferring the communication session. The application server receives a transfer request for transferring the communication session. The application server sends a set-up request to the second client, for setting up the second connection in response to the transfer request. The application server transfers the signalling path from the first connection to the second connection. The application server transfers the media path from the first connection to the second connection. The application server sends an update message towards the remote client. The update message comprises an indication that the transfer has been executed. The application server sends a termination message to the first client to terminate the first connection.

In a further embodiment an application server is disclosed. The application server comprises a receiving unit for receiving messages, a transmitting unit for transmitting messages, a processing unit processing messages and information. The receiving unit is adapted to receive a transfer request for transferring the communication session. The processing unit is adapted to process the transfer request. The processing unit is further adapted to initiate the transmission via the transmitting unit of a set-up request to the second client, for setting up the second connection in response to the transfer request. The processing unit is adapted to transfer the signalling path from the first connection to the second connection. The processing unit is further adapted to transfer the media path from the first connection to the second connection. The processing unit is further adapted to initiate the transmission via the transmitting unit of an update message towards the remote client, the update message comprising an indication that the transfer has been executed. The processing unit is further adapted to initiate the transmission via the transmitting unit of a termination message to the first client to terminate the first connection.

The embodiments provide a way to seamlessly transfer a communication session in a telecommunications network from a first connection between a first client in a first communication device and a remote client to a second connection between a second client in a second communication device and the remote client, the communication session comprising a media path and a signalling path, in a seamless way. In other words, the embodiments provide access leg transfer during a call, transferring the access leg between a first terminal and a second terminal. A subscriber may be engaged in a voice call through a first communication device (e.g. a mobile telephone MT) and may decide to change the access of the call from this first communication device to a second communication device (e.g. a SIP telephone ST) or vice versa.

The embodiments differ from Explicit Call Transfer. According to the embodiments, the connection is not re-established or transferred to another destination. The connection remains unmodified, apart from the communication device and access signalling and media transfer method that is used.

The embodiments above provide a convenient manner to transfer between a mobile telephone and a SIP telephone, without interruption. Access device transfer may be automated, when applicable, with the aid of a radio connection between the involved devices.

The embodiments provide the above-mentioned mechanisms, without imposing functional requirements on the involved communication devices.

At least some embodiments provide an automatic transfer process, when one or both of the respective devices detects that transfer is required. This is a very user-friendly way of initiating a transfer.

BRIEF DESCRIPTION OF THE DRAWINGS

Embodiments will now be described, by way of example only, with reference to the accompanying schematic drawings in which corresponding reference symbols indicate corresponding parts, and in which.

DETAILED DESCRIPTION

In the following it will be described how the invention may be implemented in an IMS network. It is apparent to a person skilled in the art that the IMS network is only an example of a telecommunications network where the invention could apply, the invention may also be implemented in other communications networks, such as communication network based on IETF SIP, but not built according to the IMS specification. The access network between the IMS network and the SIP telephone may be one of Code Division Multiple Access (CDMA), Wideband CDMA (W-CDMA), Time Division Multiple Access (TDMA), Universal Mobile Telecommunication System (UMTS) or 4G network.

Figure 1:
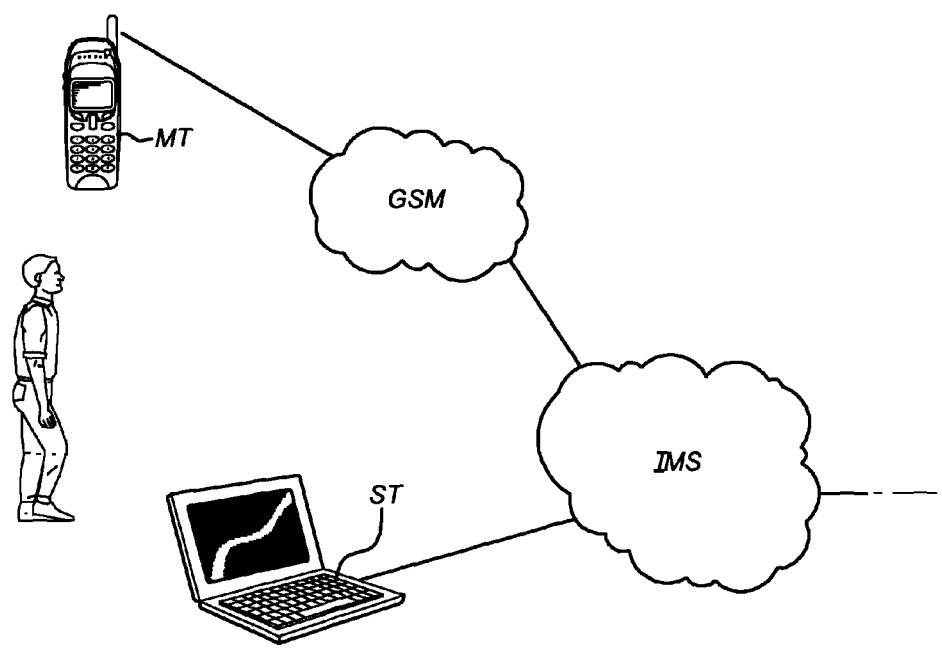
FIG. 1 schematically depicts a part of a telecommunication network.

FIG. 1 schematically depicts a situation in which a subscriber has a SIP-telephone ST, e.g. hosted by a computer arrangement, and a mobile telephone MT, according to this example a GSM mobile telephone.

The connections shown in FIG. 1 may be physical connections or wireless connections. The connections shown in FIG. 1 are only intended to show that "connected" units are arranged to communicate with one another in someway.

The embodiments relate to transferring a communication session from a first connection between a first client and a remote client to a second connection between a second client and the remote client. The communication session comprises a media path and a signalling path. The first client resides in a first communication device and the second client resides in a second communication device.

The transfer may be from the SIP telephone ST to the mobile telephone MT, or vice versa. In other words, the first client in the first communication device may be the SIP telephone ST and the second client in the second communication device may be a mobile telephone MT or, the second client in the second communication device may be a SIP telephone ST and the first client in the first communication device may be a mobile telephone MT.

Application Server

As described above, the communication network (IMS) may comprise application servers which are arranged to host and execute services. According to an embodiment there is provided an application server AS in a telecommunications network for transferring a communication session from a first connection between a first client in a first communication device and a remote client to a second connection between a second client in a second communication device and the remote client, the communication session comprising a media path and a signalling path, the application server comprising:

an input/output device I/O,
a processor unit PU,
the processor unit PU, via the input/output device I/O, being arranged to a) receive a transfer request for transferring the communication session,
b) send a set-up request to the second client, for setting up the second connection in response to the transfer request,
c1) transfer the signalling path from the first connection to the second connection,
c2) transfer the media path from the first connection to the second connection,
d) send an update message towards the remote party, the update message comprising an indication that the transfer has been executed and
e) send a termination message to the first client to terminate the first connection.

It is noted that the order of executing the different actions does not necessarily need to be equal to the order in which they are listed here. For instance, actions d) and e) may be reversed.

Figure 2:
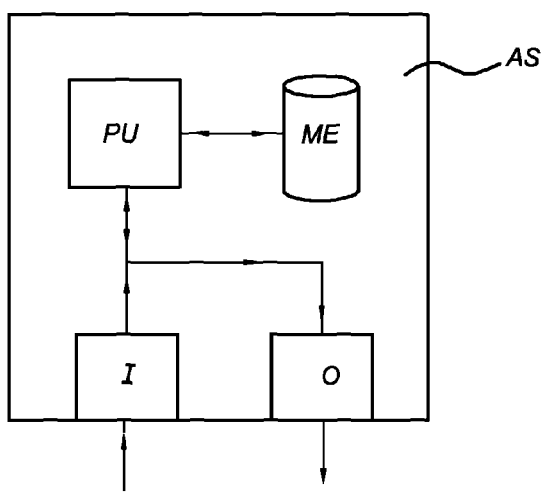
FIG. 2 schematically depicts an exemplary block diagram of an application server, FIG. 3 schematically depicts a flow diagram of exemplary steps performed by an application server, FIG. 4 schematically depicts an exemplary block diagram of a client, FIGS. 5 and 6 schematically depict flow diagrams according to embodiments.

The application server AS may be provided by a computer arrangement, of which a schematic example is provided in FIG. 2. FIG. 2 shows an application server comprising a processor unit PU, arranged to communicate with a memory ME. The application server AS further comprises a receiving unit I and transmitting unit O (possibly integrated in one input output device I/O) for receiving and transmitting respectively and thereby communicating with devices forming the telecommunications network.

The processor unit PU is connected to memory ME that may store instructions and data. The instructions may be readable and executable by the processor unit PU to provide the application server AS with the functionality in accordance with the embodiments provided.

The memory ME may be formed by one or more of a tape unit, hard disk, a Read Only Memory (ROM), Electrically Erasable Programmable Read Only Memory (EEPROM), a Random Access Memory (RAM).

The processor unit PU may also be connected to one or more input devices that are not shown, such as a keyboard, one or more output devices, such as a display, and one or more reading units to read for instance a floppy, CD ROM's, a DVD.

However, it should be understood that there may be provided more and/or other memory units, input devices and read devices known to persons skilled in the art. Moreover, one or more of them may be physically located remote from the processor unit PU, if required. The processor unit PU is shown as one box, however, it may comprise several processing units functioning in parallel or controlled by one main processor unit that may be located remote from one another, as is known to persons skilled in the art.

According to an embodiment, the receiving unit I is adapted to receive a transfer request for transferring the communication session. The processing unit PU is adapted to process the transfer request. The processing unit PU is further adapted to initiate the transmission via the transmitting unit O of a set-up request to the second client, for setting up the second connection in response to the transfer request. The processing unit PU is adapted to transfer the signalling path from the first connection to the second connection. The processing unit PU is further adapted to transfer the media path from the first connection to the second connection. The processing unit PU is further adapted to initiate the transmission via the transmitting unit I of an update message towards the remote client, the update message comprising an indication that the transfer has been executed. The processing unit PU is further adapted to initiate the transmission via the transmitting unit O of a termination message to the first client to terminate the first connection.

It is observed that, although all connections in FIG. 2 are shown as physical connections, one or more of these connections can be made wireless. They are only intended to show that "connected" units are arranged to communicate with one another in some way.

The application server AS may be arranged to perform a method for transferring a communication session in a telecommunications network from a first connection between a first client in a first communication device and a remote client to a second connection between a second client in a second communication device and the remote client, the communication session comprising a media path and a signalling path, wherein an application server performs:

a) receiving a transfer request for transferring the communication session,
b) sending a set-up request to the second client, for setting up the second connection in response to the transfer request,
c1) transferring the signalling path from the first connection to the second connection,
c2) transferring the media path from the first connection to the second connection,
d) sending an update message towards the remote party, the update message comprising an indication that the transfer has been executed and
e) sending a termination message to the first client to terminate the first connection.

Figure 3:
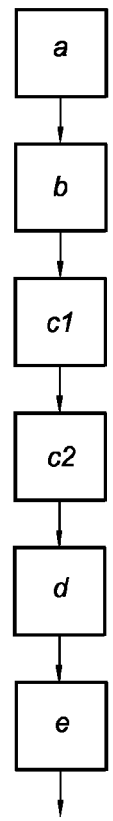

This method is schematically shown as a flow diagram in FIG. 3.

The set-up request may for instance be a SIP Invite message. In response to the set-up request to the second client the application server may receive a set-up acceptation from the second client, e.g. in a SIP OK message. The actions c1 and c2 may be performed in response to the set-up acceptation. For action d) applies that the message is sent towards the remote party and may traverse various nodes and networks en route.

In addition, a designated node in the network from the served subscriber, that is to say, the subscriber for whom the device transfer is executed, may prevent the message from being forwarded towards the network of the remote client.

The transfer may take place from the SIP telephone ST to the mobile telephone MT, or vice versa. In other words, the first client in the first communication device may be a SIP telephone and the second client in the second communication device may be a mobile telephone MT, or the second client in the second communication device may be a SIP telephone ST and the first client in the first communication device may be a mobile telephone MT.

Client

Corresponding functionality is to be provided on the SIP telephone ST and/or mobile telephone MT. So, according to an embodiment there is provided a client CL arranged to initiate transfer of a communication session in a telecommunications network from a first connection between a first client in a first communication device and a remote client to a second connection between a second client in a second communication device and the remote client, the communication session comprising a media path and a signalling path
the client CL comprising:
an input/output device,
a processor unit,
and the client CL being arranged to use the input/output device to a) generate a transfer request for transferring the communication session and transmit the transfer request to an application server.

Prior to generating the transfer request, the client CL may obtain an indication from the subscriber that device transfer is desired. Furthermore, prior to obtaining the indication, the client CL may determine whether any applicable preconditions for obtaining said indication from the subscriber are fulfilled.

Again, the first client in the first communication device may be the SIP telephone ST and the second client in the second communication device may be the mobile telephone MT, or vice versa. The client CL may be the first or second client, may host the first or second client or may be functionally be coupled to the first or second client.

Figure 4:
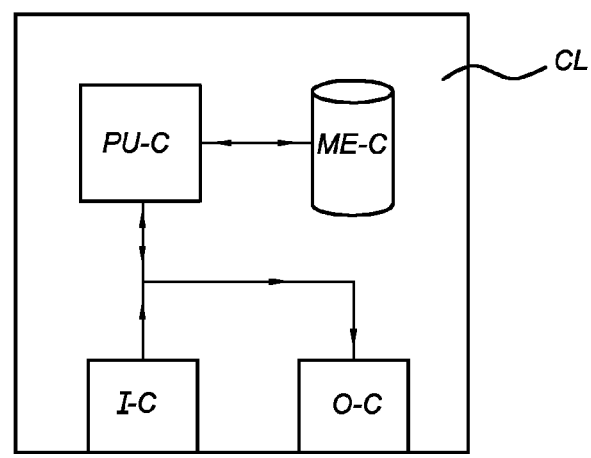

The client CL may be provided by a computer arrangement, of which a schematic example is provided in FIG. 4. FIG. 4 shows a client CL comprising a processor unit PU-C, arranged to communicate with a memory ME-C. The client CL further comprises an input device I-C and an output device O-C (possibly integrated in one input output device) for receiving and transmitting respectively and thereby communicating with devices forming the telecommunications network.

The processor unit PU-C is connected to memory ME-C that may store instructions and data. The instructions may be readable and executable by the processor unit PU-C to provide the client CL with the functionality in accordance with the embodiments provided.

The memory ME-C may be formed by one or more of a tape unit, hard disk, a Read Only Memory (ROM), Electrically Erasable Programmable Read Only Memory (EEPROM), a Random Access Memory (RAM).

The processor unit PU-C may also be connected to one or more input devices that are not shown, such as a keyboard, one or more output devices, such as a display, and one or more reading units to read for instance a floppy, CD ROM's, a DVD.

However, it should be understood that there may be provided more and/or other memory units, input devices and read devices known to persons skilled in the art. Moreover, one or more of them may be physically located remote from the processor unit PU-C, if required. The processor unit PU-C is shown as one box, however, it may comprise several processing units functioning in parallel or controlled by one main processor unit that may be located remote from one another, as is known to persons skilled in the art.

It is observed that, although all connections in FIG. 4 are shown as physical connections, one or more of these connections may be wireless connections. They are only intended to show that "connected" units are arranged to communicate with one another in someway.

The client CL may be arranged to perform a method to initiate transfer of a communication session in a telecommunications network from a first connection between a first client in a first communication device and a remote client to a second connection between a second client in a second communication device and the remote client, the communication session comprising a media path and a signalling path, wherein a client performs:

a) generating a transfer request for transferring the communication session and transmitting the transfer request to an application server.

Prior to generating the transfer request, the client CL may obtain an indication from the subscriber that device transfer is desired. Furthermore, prior to obtaining the indication, the client CL may determine whether any applicable preconditions for obtaining said indication from the subscriber are fulfilled.

The client CL may host a software tool, referred to as a call control utility, that may be arranged to provide functionality possibly including user interaction, to provide the client CL with the functionality according to the embodiments.

Below actions a)-e) may be explained in more detail. It will be understood that some actions may be performed by the application server AS, the first client or the second client, and some actions may be performed by the application server AS in cooperation with the first or second client.

Action a

Before the client CL, being either the SIP telephone ST or the mobile telephone MT, being functionally coupled to either the SIP telephone ST or the mobile telephone MT or hosting either the SIP telephone ST or the mobile telephone MT, generates a transfer request for transferring the communication session, the first client is to be triggered to do so. Three examples of this are provided below.

According to examples 1 and 2 the trigger may be provided by user input. According to example 3 the trigger may be provided in an automated way, possibly also comprising user input for confirmation.

EXAMPLE 1

The subscriber may be engaged in a call via the mobile telephone MT and approaches his/her desk on which the SIP telephone ST is located. The subscriber wants to transfer the call from the mobile telephone MT to the SIP telephone ST. Thus, the second client in the second communication device is the SIP telephone ST and the first client in the first communication device is the mobile telephone MT.

The call control utility may offer the subscriber the possibility to trigger generating a transfer request and send it to the application server AS.

EXAMPLE 2

The subscriber may be engaged in a call via the SIP telephone on his/her desk and wants to transfer the call to his/her mobile telephone MT, since he/she intends to walk away from the desk. Thus, the first client in the second communication device is the SIP telephone ST and the second client in the first communication device is the mobile telephone MT.

The call control utility may offer the subscriber the possibility to trigger generating a transfer request and send it to the application server AS.

EXAMPLE 3

According to the present example, the above mentioned call control utility is arranged to establish a radio connection with the mobile telephone MT, for instance using Bluetooth. The subscriber may be engaged in a call via the mobile telephone MT and approaches his/her desk, where the SIP telephone ST is located. When the call control utility detects, through the radio connection, that the mobile telephone MT has come in the vicinity, it asks the subscriber, e.g. by means of a pop-up menu on the PC, whether the subscriber wants to initiate a transfer. The subscriber may indicate to the call control utility (by user input such as by key press or mouse click), that a transfer is required, thereby triggering a transfer request.

It will be understood that additional use cases can be defined.

The call control utility may be separate from the SIP client, although running on the same computing platform (computer arrangement such as a PC). Advantage of using a separate call control utility is that this facilitates the use of different types of SIP telephones, without putting a requirement on these SIP telephones for special capability. The call control utility may also be combined or coupled with a mobile telephone MT.

Based on the above examples it is clear that according to an embodiment, action a) is performed in response to user input. Thus, the subscriber is provided the option to indicate that a transfer request is to be generated.

According to a further embodiment, the second client is a SIP telephone associated with the client and the first client is a mobile telephone, wherein the first client and the second client are arranged to be in contact with each other via a wireless connection, the client being arranged to monitor the quality of the wireless connection, and to ask for user input whether or not to perform a), when the quality of the wireless connection increases above a threshold quality.

The wireless connection may be one of a radio connection, a Bluetooth connection.

Before the SIP telephone ST actually offers the device transfer, it may exchange messages with the mobile telephone MT, possibly via the application server AS, to determine whether the mobile telephone MT is idle, i.e. is connected to the network (e.g. the GSM network). If not, there is no use in offering the device transfer. It is noted that in case the mobile telephone MT is idle, it may still be switched on and arranged to support a radio connection such as Bluetooth. The term idle is used to indicate that the mobile telephone MT is active and operational, but at that moment not engaged in a voice (or video etc.) communication session.

The transfer request that is sent by the client CL (being the SIP telephone ST or the mobile telephone MT) may comprise an indication of the first and second client. This indication may simply be a telephone number that is associated with the first and the second client, although other indications may be used as well.

The transfer request may comprises an indication of one of the first and second client and the application server may be arranged to retrieve an indication of the other of the first and the second client from a database. The indication may be retrieved using a database, such as register HSS.

The information about the identity of the first and second client may be used by the application server AS to identify the first and second client. This information may be used in the following actions b)-e). Also, this information may be used to determine whether a transfer request will be allowed or denied, for instance by checking subscriber or operator policies.

Based on the above, it will be understood that the application server AS is arranged to receive a transfer request from the first client or the second client. The client CL may be the first or second client, may host the first or second client or may functionally be coupled to the first or second client.

Action b

In response to action a), a further action b) is executed by the application server AS:

b) send a set-up request to the second client, for setting up the second connection in response to the transfer request and receive a set-up acceptation from the second client in response to the set-up request.

The application server AS is arranged to establish a call to the second client. The second client receives the call and starts alerting the user thereof. The application server AS, being a SIP back-to-back user agent (B2BUA), uses SIP to establish the call to the second client. Establishing the call in action b) is done such that:

no terminating IMS services are invoked for this call;
the call is delivered to the required communication device.

Hereto, a mechanism like the Globally routable user agent URI (GRUU) may be used.

The second client may be the mobile telephone MT. In that case, the call establishment signalling traverses a media gateway control function (MGCF), in order for the signalling to be delivered to the mobile telephone MT in the circuit switched (CS) domain. The SIP signalling, used in the IMS network, is converted to ISUP signalling, used in the CS network. This conversion is done by the MGCF, when the signalling traverses the boundary between the IMS network and the CS network. The GRUU that is used for establishing this call leg includes a designated number prefix. This number prefix is an indication that this call shall be delivered to the mobile telephone MT and shall bypass any call related services.

Establishment of the call to the second client may further be done in accordance with normal call establishment methodology. The subscriber may accept the call on the second client.

The application server AS may be arranged to generate a set-up request comprising a transfer indicator. This transfer indicator may be recognized by the client receiving the set-up request and may trigger special functionality in the client receiving the set-up request. This functionality may comprise providing a user indication to inform the subscriber that a set-up request is received that originates from a transfer. The user indication may for instance be a transfer message displayed to the subscriber or transfer ring-tone played to alert the subscriber of the set-up request. By providing a special user indication, the subscriber may decide more easily to accept the set-up request or not. If accepted, the client may be arranged to send a set-up acceptation to the application server in response.

According to an embodiment the client is arranged to b) receive a set-up request from the application server and send a set-up acceptation to the application server in response to the set-up request. According to a further embodiment, the client is arranged to retrieve a transfer indicator from the set-up request and provide a user indication in response to the receiving of the transfer indicator Action c Subsequent to action b), a further action c) may be executed by the application server AS, comprising actions c1) and c2):

c1) transferring the signalling path from the first connection to the second connection in response to the set-up acceptation, c2) transferring the media path from the first connection to the second connection in response to the set-up acceptation.

Action c1) may be referred to as a signalling path update. When the second client has accepted the set-up request from the application server AS in action b), the application server AS takes action to ensure that signalling coming from the direction of the remote client is forwarded towards the second client and that signalling coming from the direction of the second client is forwarded towards the remote client. The application server AS updates internal information indicating the change in the signalling path. Furthermore, the application server AS may inform the remote client of the access information of the second client, e.g. by sending a SIP Update message towards the remote client. The access information indicates the type of access network that is used by a device, e.g. GSM or WLAN. The access information may give an indication of the terminal capabilities of the second client, allowing the remote client to make use of other terminal capabilities towards the second client during the remainder of the communication session.

Action c2) may be referred to as a media path update. When the second client has accepted the set-up request from the application server AS in action b), the application server AS updates the media path to/from the remote client, to start exchanging media with the second client, instead of with the first client. The application server AS may send a SIP Update message towards the remote client, whereby the SIP Update message contains a Session description protocol (SDP) with the IP address to be used for the media transfer to the second client. The SDP is a standardised description of the media that is exchanged between subscribers in the IMS network and/or servers in the IMS network.

According to an embodiment, action c2) is performed by the application server AS by transferring the media path from a first IP address associated with the first communication device to a second IP address associated with the second communication device.

According to a further embodiment the SIP Update message of action c1) and the SIP Update message of action c2) may be combined in one SIP Update message.

Action d

Action d) comprises: d) sending an update message towards the remote party, the update message comprising an indication that the transfer has been executed. This action is performed by the application server AS to inform relevant nodes in the network that the subscriber has changed access network and has changed terminal. The change in access network may lead to a change in call charge; the change in terminal may lead to different service logic behaviour.

According to an embodiment there is provided an application server AS, wherein the update message comprises access information. The access information may be sent towards the remote party, for instance at least to the remote network. The access information may comprise information indicating which access network (radio network) is used by the user of the first and second client.

Action e

As a final action, action e) may be performed comprising sending a termination message to the first client to terminate the first connection. The termination message may be generated and sent by the application server AS. The first client may be arranged to receive such a termination message.

A client may be provided, wherein the first client is a SIP telephone ST associated with the client and the second client is a mobile telephone MT, wherein the client is further arranged to e) receive a termination message from the application server to terminate the first connection in response to the transmitted transfer request.

According to an embodiment there is provided an application server, wherein the termination message contains a transfer indicator. The application server AS may be arranged to generate a termination message containing such a transfer indicator. This transfer indication may be used by the first client to initiate outputting a message to the subscriber to indicate that the call is not terminated, but transferred. Therefore, there is provided a first client, wherein the first client is arranged to retrieve a transfer indicator from the termination message and provide a user indication in response to receiving the transfer indicator.

According to an embodiment there is provided a computer program that, when loaded on a computer, provides the computer with the functionality to perform one of the methods described here. The computer program may be a first computer program that when loaded on a computer, provides the computer to function as an application server AS as described in the embodiments. The computer program may also be a second computer program that when loaded on a computer, provides the computer to function as client as described. Such a second computer program may be a call control utility as described.

According to a further embodiment, there is provided a data carrier, comprising such a first or second computer program. The data carrier may be a memory, a floppy, a CD, DVD etc.

EXAMPLES

Below two examples are provided. In a first example the first client is a mobile telephone MT and the second client is a SIP telephone (thus: transfer from mobile telephone MT to SIP telephone ST). The second example is vice versa.

Example 1

First a communication session from a first connection between a first client in a first communication device (mobile telephone MT), with an application server AS residing in the IMS network is established. This process is known to a skilled person and may comprise four main actions (I, II, III, IV) that each may comprise more than one sub-action:

I) the application server AS anchors the call in IMS,
II) the application server AS establishes the call to the remote client,
III) the answer from the remote client is reported to the application server AS, and
IV) the application server AS forwards the answer to the first client (the mobile telephone MT).

The IMS network may comprise the following nodes/devices:
the mobile telephone MT as described above,
a switching node, such as a Mobile Switching Centre (MSC),
the application server AS as described above, a protocol converter PC which may provide a media gateway control function, forming a border gateway between circuit switched and IMS network an inbound proxy IP, which may function to determine which serving node (such as a serving Call State Control Function (S-CSCF)) to use for the particular subscriber, for instance using register HSS. The inbound proxy IP may also be referred as an Interrogating CSCF (I-CSCF) whose role is to select the correct S-CSCF during registration and, in a terminating session, to find the correct S-CSCF that serves the targeted user terminal, register HSS, which is a database in which subscriber information is stored, such as subscriber names, associated telephone numbers, IP addresses etc.

a Serving CSCF (S-CSCF) which provides services to the subscriber that the subscriber is subscribed to.

As explained above, the register HSS is in fact a database comprising information about the IMS network subscribers. The HSS may comprise information about the subscriber's subscription, i.e. user profiles. Also, the HSS plays an important role when a user terminal registers to the IMS network, as it authenticates and authorizes the user terminal. HSS comprises information about the location of a subscriber (allocated Serving CSCF) and provides information to a Serving CSCF that is used as part of the registration procedure, e.g. by providing the Serving CSCF with authentication parameters (which authentication method to be used and data for performing the chosen authentication method). HSS also downloads the user profile to the Serving CSCF that e.g. contains the Initial Filter Criteria instructing the Serving CSCF which application servers AS shall be linked in over the ISC interface for originating and terminating SIP transactions.

The register HSS may also be referred to as a home subscriber server. However, it will be understood that this may more generally be referred to as a subscriber database.

Setting up the first connection between the first client in the first communication device and the remote client may be done in accordance with the prior art. This may comprise suitable protocols, such as the Session Initiation Protocol (SIP), which is known for setting up multimedia communication sessions.

The actions I-IV described above relate to setting up the first connection and thus takes place before transferring the communication session (see actions a)-e) as described in more detail below).

Before transforming the communication session, a radio connection may be established between the mobile telephone MT and a computer based call control utility, that may run on a client, that may for instance host the SIP telephone ST (in this example the second client). The radio connection may be established by Bluetooth pairing.

This Bluetooth pairing has previously been established between the mobile telephone MT and the call control utility. The subscriber, engaged in a mobile telephone voice call, approaches his desk where the SIP telephone ST is located. The call control utility detects the vicinity of the mobile telephone MT and notifies the application server AS.

The detection of the mobile telephone MT, e.g. through Bluetooth, by the call control utility, may apply a certain 'hysteresis'. Hysteresis entails, for this use case, that the call control utility is arranged to detect presence of the mobile telephone MT only if defined minimum signal quality (e.g. signal strength) is determined, before it prompts the subscriber for transferring.

Also, after presence of the mobile telephone MT is determined, the call control utility may perform the functionality explained with reference to FIG. 5 before prompting the subscriber for transferring the communication session. The call control utility, which may be hosted by client, may send a status query to the application service AS in action 5.1. The purpose of this status query may be to find out if the mobile telephone MT of which the presence is detected is in fact participating in a first connection.

The status query may comprise an indication of the SIP telephone ST and mobile telephone MT associated with the subscriber. In fact, the status query may also comprise only one of these two indications. The application server AS may be arranged to retrieve the indication missing from the status query based on the indication that is comprised in the status query.

The application server AS is arranged to receive the status query and generate a status message to the call control utility in action 5.2.

The call control utility may be arranged to provide output to the subscriber prompting the subscriber to provide user input. The output may be generated in action 5.3 and may comprise a question like: Mobile telephone call detected. Would you like to transfer the call to your desk telephone? The subscriber may answer this question by providing appropriate input in action 5.4. If the subscriber wants to transfer the call (so action 5.4 is Yes) the call control utility may perform action a):

a) generate a transfer request for transferring the communication session and transmit the transfer request to the application server AS.

The application server AS may be arranged to:

a) receive a transfer request for transferring the communication session,

According to an embodiment, the call control utility may perform, through user provisioning, mapping between a MAC address of the mobile telephone MT and the subscriber identity (e.g. mobile subscriber ISDN-MSISDN). The call control utility checks with the application sever AS whether the particular subscriber is currently engaged in a mobile telephone call. If this is not the case, the call control utility takes no further actions to initiate a transfer. If this is the case, the call control utility offers the subscriber to transfer the call to the SIP telephone ST. If the subscriber accepts the offer, then the call control utility informs the application server thereof.

The transfer is further explained with reference to FIG. 6. FIG. 6 shows the first client (mobile telephone MT), the application server AS, the inbound proxy IP, the second client (SIP telephone ST) and the remote party RP. FIG. 6 further shows a proxy CSCF, which acts as a user-to-network proxy for the remote party RP.

FIG. 6 shows actions b)-e), i.e. shows how a transfer is executed. Action a) is already explained with reference to FIG. 5. Actions a)-e) may be described as follows:

a) transmitting a transfer request for transferring the communication session from the first client to the application server, b) sending a set-up request from the application server to the second client, for setting up the second connection in response to the transfer request and the application server receiving a set-up acceptation from the second client in response to the set-up request, c1) transferring the signalling path from the first connection to the second connection in response to the set-up acceptation, c2) transferring the media path from the first connection to the second connection in response to the set-up acceptation, d) sending an update message from the application server towards the remote party, the update message comprising an indication that the transfer has been executed and e) send a termination message from the application server to the first client to terminate the first connection.

Arrow 6.1 represents the SIP session that currently exists between the first client (i.e. the served subscriber) and the application server AS. Arrow 6.2 represents the SIP session that currently exists between the application server AS and the remote party. Both sessions 6.1 and session 6.2 may traverse one or more SIP proxies. Session 6.1, in the present example, is connected to ISUP and DTAP link with the first client/served subscriber.

The application server AS receives an indication that a transfer is required. The application server AS knows, for instance by virtue of receiving the transfer request in action a), to which second client the transfer has to be established.

After the application server AS received a transfer request in action a), for instance in accordance with the explanation above with reference to FIG. 5, the application server AS performs action b) resulting in actions 6.3-6.8 being performed.

First, the application server AS sends a set-up request to the second client for setting up the second connection in response to the transfer request. This is shown by arrow 6.3 being a SIP Invite message. The application server AS establishes the call towards the Globally routable user agent URI (GRUU) of the SIP telephone ST, indicated by arrows 6.3-6.5 showing a SIP Invite message being transmitted from the application server AS to the second client via the inbound proxy IP and the proxy CSCF.

The calling line identity for this call may be set to the line identity of the remote party RP of the call that is being transferred to in this example the SIP telephone ST. The GRUU may previously been reported to the application server AS, in accordance with 3GPP Rel-7 standard methodology. There may not be a service invocation for the call to the second client, in this example the SIP telephone ST. The SIP telephone ST answers the phone, by virtue of the subscriber accepting the incoming call.

Actions 6.6-6.8 depict the set-up acceptation sent from the second client, in this example the SIP telephone ST, in response to the set-up request.

According to an embodiment, the call control utility is separate from the SIP client. This facilitates that any SIP client may be used. It even facilitates that the call is transferred to a SIP telephone ST external to the computer arrangement used for hosting the call control utility, e.g. a standalone SIP telephone ST connected to Ethernet and standing on the desk next to the computer arrangement.

Next, actions c1) and c2) are performed:

c1) transferring the signalling path from the first connection to the second connection in response to the set-up acceptation, and c2) transferring the media path from the first connection to the second connection in response to the set-up acceptation.

In FIG. 6 this is depicted with action 6.9, depicting a SIP Update message being transmitted towards the remote party RP. The application server AS updates the SIP session with the remote party RP. Specifically the session description protocol SDP needs to be updated in order to have the remote party RP start exchanging media with the second client instead of with the first client. Furthermore, the application server AS may inform the remote party RP of the access information of the second client, by sending an indication of the access information of the second client in the SIP Update message.

Action d), related to informing the remote party RP that a device transfer took place, is not reflected in FIG. 6.

Finally, action e) is performed, i.e. e) sending a termination message to the first client to terminate the first connection, depicted by arrows 6.10 and 6.11 respectively showing a SIP Bye message being sent from the application server AS towards the first client and a SIP Ok message confirming the termination by the first client to the application server AS. The SIP session (and ISUP connection and DTAP connection) with the first client of the served subscriber is terminated. It will be understood that the signalling shown in FIG. 6, between the AS and the MT, may traverse various network nodes and that said signalling consists of a mix (concatenation) of SIP signalling, ISUP signalling and DTAP signalling.

Example 2

Example 2 describes a transfer from a SIP telephone ST to a mobile telephone MT by an explicit request. This example relates to the situation wherein a subscriber is engaged in a (voice) call through a SIP telephone ST. The SIP telephone ST may be a computer based SIP client or a stand-alone, desktop-bound SIP telephone, e.g. connected to Ethernet. The subscriber intends to continue the call on his/her mobile telephone MT, i.e. the first connection between the first client in a first communication device (SIP telephone ST) and a remote client is to be transferred to a second connection between a second client in a second communication device (mobile telephone MT) and the remote client. The communication session comprises a media path and a signalling path.

The subscriber may indicate on the computer based call control utility that he/she intends to execute the transfer from the SIP telephone ST to the mobile telephone MT. The call control utility signals a transfer request to the application server AS. The transfer request sent by the call control utility to the application server AS may include an indication of the second client (i.e. the mobile telephone MT) that shall act as second client for this transfer. The call control utility may e.g. include the MSISDN of the subscriber in the transfer request as indication. The transfer request may thus comprise an indication of the second client and possibly also an indication of the first client.

The application server establishes an access connection with the mobile telephone MT and releases the access connection with the SIP telephone (actions b) and e)).

Before doing this, the application server AS may perform a check to verify that the second client (mobile telephone MT), e.g. an indication such as MSISDN to indicate the second client, forms part of the profile of the subscriber associated with the first client (in this case the SIP telephone ST).

According to this example, the subscriber triggers the call control utility to initiate the transfer by generating and sending a transfer request, i.e. action a) is performed at the client in response to user input. Therefore, according to this example it is not needed for the call control utility to check whether the mobile telephone MT is in the vicinity. It may be assumed that the mobile telephone MT is in the vicinity, otherwise the subscriber would not trigger the call control utility to generate a transfer. Hence, there is no strict requirement for Bluetooth support in the call control utility or in the GSM phone. The signal sequence for this example, starting from action b), is functionally similar to the signal sequence as shown in FIG. 6.

It is emphasized that the explicit access device transfer request (action a) in response to user input) may be used for various forms of transfer, including, but not limited to:

transfer from mobile telephone MT to SIP telephone ST (example 1), transfer from SIP telephone ST to mobile telephone MT (example 2), transfer from SIP telephone ST to mobile VOIP telephone, e.g. SIP over WLAN or SIP over HSPA; the second client (to which the transfer is performed) may be a VCC phone, supporting both GSM access and SIP over WLAN or HSPA access and having the capability to perform an access transfer during an ongoing voice call.

When the transfer is executed from a SIP telephone ST to a VCC telephone, using WLAN for access to IMS, the subscriber may subsequently perform an access transfer to GSM access, in the case the subscriber is leaving the WLAN coverage.

Further Remarks

The embodiments above relate to an IMS network, but it will be understood that that the embodiments may also be put to practice in other networks, generally referred to as communications networks, like a GSM, Code Division Multiple Access (CDMA), Time Division Multiple Access (TDMA), Universal Mobile Telecommunication System (UMTS), or 4G network.

It will be understood that an IMS network may comprise more and other nodes than described here. Nodes may also be present more than once, for instance for load balancing or organizational reasons. Also, nodes that are shown as separate nodes may in fact be formed as one element, incorporating the functions of the incorporated nodes. Also, nodes may be split in two or more nodes.

The descriptions above are intended to be illustrative, not limiting. Thus, it will be apparent to one skilled in the art that modifications may be made to the invention as described without departing from the scope of the claims set out below.

The invention claimed is:

1. A method for transferring a communication session in a telecommunications network from a first connection between a first client and a remote client to a second connection between a second client and the remote client, the communication session comprising a media path and a signaling path, the method comprising:
    receiving a transfer request for transferring the communication session,
    sending a set-up request to the second client for setting up the second connection in response to the transfer request,
    transferring the signaling path from the first connection to the second connection,
    transferring the media path from the first connection to the second connection,
    sending an update message towards the remote client, the update message comprising an indication that the transfer has been executed, and
    sending a termination message to the first client to terminate the first connection.

2. The method according to claim 1, wherein the first client resides in a first communication device and the second client resides in a second communication device.

3. The method according to claim 2, wherein the first communication device is a Session Initiation Protocol telephone and the second communication device is a mobile telephone.

4. The method according to claim 2, wherein the second communication device is a Session Initiation Protocol telephone and the first communication device is a mobile telephone.

5. The method according to claim 1, further comprising receiving a set-up acceptation from the second client in response to the set-up request.

6. The method according to claim 1, wherein the transfer request comprises an indication of the first and second client.

7. The method according to claim 1, wherein the transfer request comprises an indication of one of the first and second client and wherein the method further comprises retrieving an indication of the other of the first and the second client from a database.

8. The method according to claim 1, wherein transferring the signaling path from the first connection to the second connection comprises sending an indication of access information of the second client to the remote client.

9. The method according to claim 1, wherein transferring the media path from the first connection to the second connection is performed by transferring the media path from a first IP address associated with the first communication device to a second IP address associated with the second communication device.

10. The method according to claim 1, wherein the transfer request is received from the first client.

11. The method according to claim 1, wherein the transfer request is received from the second client.

12. The method according to claim 1, wherein the set-up request comprises a transfer indicator.

13. An application server in a telecommunications network for transferring a communication session from a first connection between a first client and a remote client to a second connection between a second client and the remote client, the communication session comprising a media path and a signaling path, the application server comprising:
    a receiving unit for receiving messages,
    a transmitting unit for transmitting messages,
    a processing unit for processing messages and information, wherein
    the receiving unit is adapted to receive a transfer request for transferring the communication session,
    the processing unit is adapted to process the transfer request,
    the processing unit is further adapted to initiate a transmission via the transmitting unit of a set-up request to the second client and for setting up the second connection in response to the transfer request,
    the processing unit is adapted to transfer the signaling path from the first connection to the second connection,
    the processing unit is further adapted to transfer the media path from the first connection to the second connection,
    the processing unit is further adapted to initiate a transmission via the transmitting unit of an update message towards the remote client, the update message comprising an indication that the transfer has been executed, and
    the processing unit is further adapted to initiate a transmission via the transmitting unit of a termination message to the first client to terminate the first connection.

14. A non-transitory computer-readable medium that stores computer-executable process steps for transferring a communication session in a telecommunications network from a first connection between a first client and a remote client to a second connection between a second client and the remote client, the communication session comprising a media path and a signaling path, said computer-executable process steps causing a computer to perform the steps of:
    receiving a transfer request for transferring the communication session,
    sending a set-up request to the second client for setting up the second connection in response to the transfer request,
    transferring the signaling path from the first connection to the second connection, transferring the media path from the first connection to the second connection, sending an update message towards the remote client, the update message comprising an indication that the transfer has been executed, and sending a termination message to the first client to terminate the first connection.

\* \* \* \* \*

UNITED STATES PATENT AND TRADEMARK OFFICE
CERTIFICATE OF CORRECTION

| | |
|---|---|
| PATENT NO. | : 8,494,527 B2 |
| APPLICATION NO. | : 13/384315 |
| DATED | : July 23, 2013 |
| INVENTOR(S) | : Noldus et al. |

It is certified that error appears in the above-identified patent and that said Letters Patent is hereby corrected as shown below:

On the Title Page, in the figure, for Tag "6.11", delete "SIP Oke" and insert -- SIP Ok --, therefor.

In the Drawings

In Fig. 6, Sheet 4 of 4, for Tag "6.11", delete "SIP Oke" and insert -- SIP Ok --, therefor.

In the Specification

In Column 11, Line 2, delete "indicator" and insert -- indicator. --, therefor.

In Column 13, Line 3, delete "network" and insert -- network, --, therefor.

In Column 14, Line 30, delete "session," and insert -- session. --, therefor.

Signed and Sealed this
Twentieth Day of May, 2014

Michelle K. Lee
*Deputy Director of the United States Patent and Trademark Office*